US008594558B2

(12) United States Patent
Childress et al.

(10) Patent No.: US 8,594,558 B2
(45) Date of Patent: Nov. 26, 2013

(54) METHODS AND APPARATUSES OF PROVIDING MULTIMEDIA CONTENT TO A MOBILE DEVICE

(75) Inventors: C. Cullen Childress, Austin, TX (US); Jason Kenagy, La Jolla, CA (US); J. Adam Mucci, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1032 days.

(21) Appl. No.: 12/031,638

(22) Filed: Feb. 14, 2008

(65) Prior Publication Data

US 2008/0305737 A1 Dec. 11, 2008

Related U.S. Application Data

(60) Provisional application No. 60/942,605, filed on Jun. 7, 2007.

(51) Int. Cl.

| | |
|---|---|
| ***H04H 20/71*** | (2008.01) |
| ***H04H 40/00*** | (2008.01) |
| ***H04B 1/16*** | (2006.01) |
| ***H04B 1/38*** | (2006.01) |

(52) U.S. Cl.
USPC ....... 455/3.01; 455/3.06; 455/343.2; 455/574

(58) Field of Classification Search
USPC ................ 455/3.01, 3.04, 3.06, 414.1, 412.1, 455/66.1, 344, 343.1
See application file for complete search history.

(56) References Cited

U.S. PATENT DOCUMENTS 6,246,672 B1 * 6/2001 Lumelsky .................... 370/310
6,597,891 B2 * 7/2003 Tantawy et al. .............. 455/3.05
6,711,474 B1 * 3/2004 Treyz et al. ........................ 701/1
6,842,433 B2 * 1/2005 West et al. .................... 370/312
6,950,623 B2 * 9/2005 Brown et al. ................ 455/3.01

(Continued)

FOREIGN PATENT DOCUMENTS

EP 1622 341 A2 * 7/2005 .............. H04M 1/02
EP 1622341 2/2006

(Continued)

OTHER PUBLICATIONS

International Search Report, PCT/US2008/066193, International Searching Authority, European Patent Office, Nov. 12, 2008.

(Continued)

*Primary Examiner* — Tilahun B Gesesse
(74) *Attorney, Agent, or Firm* — The Marbury Law Group, PLLC

(57) ABSTRACT

Embodiments include systems and methods of accessing data items, including, for example, data items receivable over a broadcast network. One embodiment includes a method of accessing broadcast data items that includes receiving, on a mobile device over a broadcast wireless network, data identifying a plurality of data items available for reception by the mobile device. The method further includes transmitting, from the mobile device over a wireless network, a request for communication of at least one of the plurality of data items from a content delivery service to a repository device, detecting a connection of the mobile device with the repository device, and in response to said detecting, the mobile device receives at least a portion of the at least one data item from the repository device using the connection. Other embodiments include a mobile device, a repository device, and a content delivery service and related methods.

57 Claims, 6 Drawing Sheets

(56) References Cited

U.S. PATENT DOCUMENTS

| | | | | |
|---|---|---|---|---|
| 7,088,952 | B1 * | 8/2006 | Saito et al. | 455/3.06 |
| 7,113,738 | B2 * | 9/2006 | Salurso et al. | 455/3.01 |
| 7,149,499 | B1 * | 12/2006 | Oran et al. | 455/404.2 |
| 7,197,495 | B2 * | 3/2007 | Deguchi et al. | 1/1 |
| 7,215,660 | B2 * | 5/2007 | Perlman | 370/338 |
| 7,362,952 | B2 * | 4/2008 | Katagishi et al. | 386/291 |
| 7,369,868 | B2 * | 5/2008 | Dunko et al. | 455/517 |
| 7,471,665 | B2 * | 12/2008 | Perlman | 370/338 |
| 7,493,078 | B2 * | 2/2009 | Perlman | 455/3.01 |
| 7,505,731 | B2 * | 3/2009 | Aaltonen et al. | 455/3.01 |
| 7,525,932 | B2 * | 4/2009 | Tischer | 370/310 |
| 7,558,525 | B2 * | 7/2009 | Perlman | 455/3.01 |
| 7,558,528 | B2 * | 7/2009 | King | 455/7 |
| 7,720,581 | B2 * | 5/2010 | Yaqub | 701/33 |
| 7,729,709 | B1 * | 6/2010 | Loeb et al. | 455/456.3 |
| 7,787,818 | B2 * | 8/2010 | Shapiro et al. | 455/3.01 |
| 7,881,656 | B2 * | 2/2011 | Khedouri et al. | 455/3.01 |
| 7,899,592 | B2 * | 3/2011 | Yaqub | 701/33 |
| 7,908,172 | B2 * | 3/2011 | Corts et al. | 705/14.66 |
| 7,992,205 | B2 * | 8/2011 | McRae et al. | 726/22 |
| 8,155,580 | B2 * | 4/2012 | Maggenti et al. | 455/3.01 |
| 8,165,598 | B2 * | 4/2012 | Tran et al. | 455/456.1 |
| 8,219,134 | B2 * | 7/2012 | Maharajh et al. | 455/519 |
| 8,301,164 | B2 * | 10/2012 | Tran et al. | 455/456.1 |
| 2001/0031626 | A1 * | 10/2001 | Lindskog et al. | 455/67.3 |
| 2002/0059618 | A1 * | 5/2002 | Venter | 725/87 |
| 2002/0069406 | A1 * | 6/2002 | Aaltonen et al. | 725/34 |
| 2004/0052504 | A1 * | 3/2004 | Yamada et al. | 386/68 |
| 2004/0087326 | A1 * | 5/2004 | Dunko et al. | 455/517 |
| 2004/0107447 | A1 * | 6/2004 | Katagishi et al. | 725/135 |
| 2004/0110464 | A1 * | 6/2004 | Perlman | 455/3.04 |
| 2006/0166617 | A1 * | 7/2006 | Passmore | 455/3.06 |
| 2007/0016918 | A1 * | 1/2007 | Alcorn et al. | 725/22 |
| 2007/0298708 | A1 * | 12/2007 | Maggenti et al. | 455/3.01 |
| 2008/0160909 | A1 * | 7/2008 | Khedouri et al. | 455/3.06 |
| 2008/0207137 | A1 * | 8/2008 | Maharajh et al. | 455/74 |
| 2009/0185522 | A1 * | 7/2009 | Periyalwar et al. | 370/328 |

FOREIGN PATENT DOCUMENTS

| | | | |
|---|---|---|---|
| JP | 2002158951 | A | 5/2002 |
| JP | 2005210644 | A | 8/2005 |
| JP | 2005286855 | A | 10/2005 |
| JP | 2006033120 | A | 2/2006 |
| JP | 2006041905 | A | 2/2006 |
| JP | 2007088722 | A | 4/2007 |
| WO | 03032620 | | 4/2003 |
| WO | 03043322 | | 5/2003 |

OTHER PUBLICATIONS

Written Opinion, PCT/US2008/066193, International Searching Authority, European Patent Office, Nov. 12, 2008.

European Search Report—EP08006475—European Patent Office—The Hague—Nov. 5, 2008.

International Preliminary Report on Patentability, PCT/US2008/066193, International Preliminary Examining Authority, Sep. 21, 2009.

* cited by examiner

METHODS AND APPARATUSES OF PROVIDING MULTIMEDIA CONTENT TO A MOBILE DEVICE

RELATED APPLICATIONS

This application claims priority to U.S. Provisional Application No. 60/942,605, filed Jun. 7, 2007.

This application relates generally to communications, and more specifically, to communication of streamed multimedia data.

BACKGROUND

Electronic devices such as mobile telephone handsets and other mobile devices may be configured to receive broadcasts of sports, entertainment, or informational multimedia programs. For example, audio, or video data may be communicated using a broadband broadcast communications link to the electronic devices. Thus, a need exists for methods and apparatuses for providing and viewing broadcast media on such electronic devices.

SUMMARY

Methods and apparatuses of the disclosure each have several embodiments, no single one of which is solely responsible for its desirable attributes. Without limiting the scope of this invention, for example, as expressed by the claims which follow, its more prominent features will now be discussed briefly. After considering this discussion, and particularly after reading the section entitled "Detailed Description" one will understand how the features of this invention provide advantages that include allowing an electronic device to request a program to be stored onto a proxy device used for reliable retrieval of requested program by using device synchronization.

One embodiment includes a method of accessing broadcast programs. The method includes receiving, on a mobile device over a first wireless network, data identifying a plurality of data items. The method further includes transmitting, from the mobile device over a second wireless network, a request for communication of at least one of the plurality of data items from a content delivery service to a repository device. The method further includes detecting a connection of the mobile device with the repository device. In response to said detecting, the mobile device receives at least a portion of the at least one data item from the repository device using the connection.

One embodiment includes a method of accessing broadcast programs. The method includes receiving, over a wireless network from a mobile device, a request for at least one of a plurality of broadcasts of data items, an identifier of the data item having been transmitted to the mobile device over a broadcast network, identifying a repository device associated with the mobile device, and communicating at least a portion of the at least one of the plurality of data items to the repository device for transmission to the mobile device.

One embodiment includes a method of accessing broadcast programs. The method includes receiving in a repository device and from a content delivery service at least one data item, the receiving being in response to a mobile device identifying the data item. The method further includes storing said at least one data item, detecting connectivity to the mobile device with the repository device, and, in response to said detecting, transmitting the at least one data item from the repository device to the mobile device.

One embodiment includes an apparatus for accessing broadcast programs. The apparatus includes a first network interface configured to receive at least one data item from a content delivery service in response to a mobile device identifying the at least one data item, a storage configured to store the at least one data item, a second network interface configured to detect a connection to the mobile device and, in response to said detecting, transmitting the at least one data item from the storage to the mobile device. One such embodiment includes a power supply configured to provide a charging current to the mobile device in response to said detecting. In one embodiment, the apparatus is unable to decode the at least one program Other embodiments include methods and apparatuses for accessing and requesting broadcast programming in ways that allow an interrupted electronic device to access requested programs at a later time by communicating with a repository device used to reliability acquire content from a content provider and reliably transmit content and power to the interrupted electronic device.

DETAILED DESCRIPTION

Figure 1:
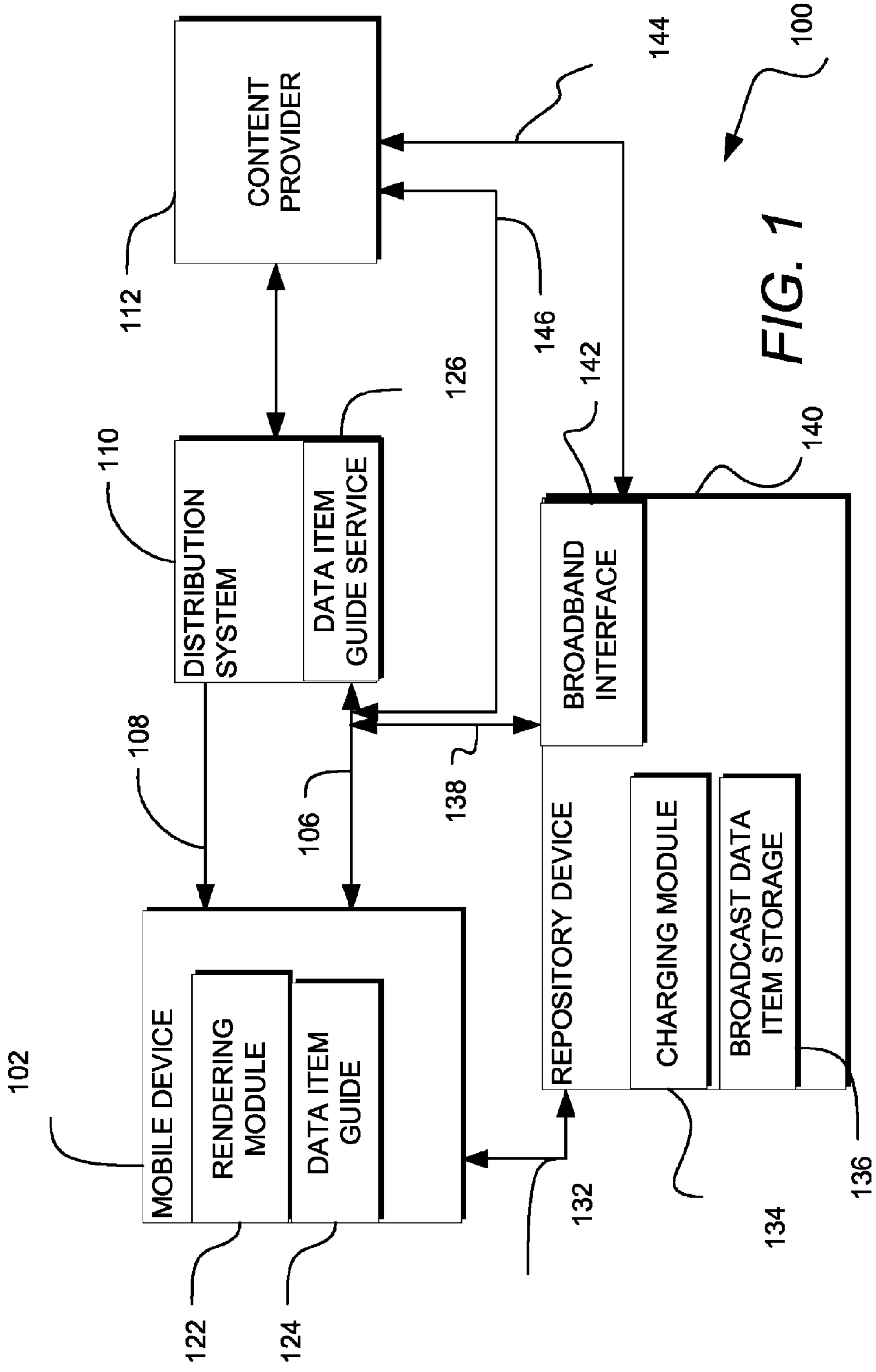
FIG. 1 is a block diagram illustrating an exemplary system for providing broadcast programming to mobile devices.

The following detailed description is directed to certain embodiments of the disclosure. However, the invention can be embodied in a multitude of different ways, for example, as defined and covered by the claims. It should be apparent that the embodiments herein may be embodied in a wide variety of forms and that any specific structure, function, or both being disclosed herein is merely representative. Based on the teachings herein one skilled in the art should appreciate that an embodiment disclosed herein may be implemented independently of any other embodiments and that two or more of these embodiments may be combined in various ways. For example, an apparatus may be implemented or a method may be practiced using any number of the embodiments set forth herein. In addition, such an apparatus may be implemented or such a method may be practiced using other structure, functionality, or structure and functionality in addition to or other than one or more of the embodiments set forth herein.

In one embodiment, devices configured to display broadcast media may be configured to perform other functions. Sometimes, functions cannot be performed simultaneously due to, for example, lack of processing capability, a need for conserving battery power, or the inability of the user to perform two tasks at the same time. For example, if the device is rendering a broadcast program when a telephone call is received, the mobile device would usually interrupt the multimedia program in order to answer the telephone call. In addition, mobile devices may at times be unable to receive the broadcast signal due to signal degradation. Thus, an interrupted user viewing a broadcast program using a mobile device may lose a portion of the program; this can be inconvenient and cumbersome for the user, especially in regard to streaming media content. Thus, according to one embodiment, in response to a request from a mobile device, all or a portion of the program is transmitted to a repository device via a network less subject to interruption (e.g., a wired network connect) for later transmission to the mobile device. For example, the repository device may comprise a charger or charging station for the mobile device that is configured to communicate the data (e.g., items that take a long time to download) to the mobile device when the device is connected for charging.

According to one embodiment, a portion, e.g., the missed or interrupted portion, of a program may be automatically identified by a mobile device or a user as being interrupted. A request may then be communicated to a content delivery service that is configured to provided the program to the mobile device by the use of an intermediary repository device located in a that is connected via an a wired or other connection that is less subject to interruption than a wireless connection to the mobile device. In another embodiment, a server may apply predefined criteria to identify program content that is automatically communicated to the repository device for retrieval. In another embodiment, the mobile device requests the identified program, either the full program or a portion of the program, from a server such as a distribution system or other head-end systems, which are configured to identify and transmit the program to a repository device in response to the program being identified by the mobile device. Alternatively, the user of the mobile device requests data from a catalog of data such as programs, ringtones, applications, etc.

FIG. 1 is a block diagram illustrating an exemplary system 100 for providing broadcast programming to mobile devices 102 from one or more content providers 112 using a distribution system 110. While a single mobile device 102 is shown in FIG. 1, an exemplary system 100 may be configured to use any number of mobile devices 102. The system 100 also includes a distribution system 110 and a content provider 112. The distribution system 110 may receive data representing a multimedia program from the content provider 112. In one embodiment, the distribution system 110 may deliver program data to a proxy or repository device 140 for subsequent delivery to the mobile device 102. The multimedia programs may be communicated to the repository device 140 over a wired or wireless program communication link 108. In one embodiment, the communications link 108 may be a high speed or broadband link. In one embodiment, the content provider 112 may communicate content directly over a second wireless or wired link 146 to the mobile device 102, bypassing the distribution system 110. It is to be recognized that in other embodiments multiple content providers 112 may provide programs to the mobile devices 102 using multiple distribution systems 110.

In the exemplary system 100 of FIG. 1, the program communication link 108 is illustrated as a unidirectional network. However, the program communication link 108 may also be a fully symmetric bi-directional network. The program communication link 108 may comprise one or more wired and/or wireless links, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, Mobile-Originated Short Message Service (MO-SMS) system, a 3G data network system, a high data rate (1xEV-DO or 1xEV-DO Gold Multicast) system, an IEEE 802.11 system, a MediaFLO system, a DMB system, an orthogonal frequency division multiple access (OFDM) system, or a DVB-H system.

In the exemplary system 100, the mobile device 102 may also be configured to communicate on a third communication link 106 which may comprise any of the networks described above with reference to the link 108. In one embodiment, the communication link 106 may be a two way communication link as is illustrated in the exemplary system 100. The communication link 106 may be used in communication between the mobile device 102 and the broadcast center or distribution system 110 and/or the content provider 112. In one embodiment, the distribution system 110 may be a broadcast center. The third communication link 106 may also be facilitated over a wireless network configured to communicate voice traffic and/or data traffic. The communication link 106 may communicate program guide and other data between the distribution system 110 and the mobile device 102.

The mobile device 102 includes a rendering module 122 configured to render the multimedia programming received over the program communication link 108. The rendering module 122 may include analog and/or digital technologies. The rendering module 122 may include one or more multimedia signal processing systems, such as video encoders/decoders, using encoding/decoding methods based on international standards such as MPEG-x and H.26x standards. Such encoding/decoding methods generally are directed towards compressing the multimedia data for transmission and/or storage.

In addition to communicating programming content to the mobile device 102, the distribution system 110 may also include a program guide service 126. The program guide service 126 receives program schedule and content related data from the content provider 112 and/or other sources and communicates data representing an electronic programming guide (EPG) 124 to the mobile device 102. The EPG 124 may include data related to the broadcast schedule of multiple programs available to be received over the program communication link 108. The EPG data may include titles of programs, start and end times, category classification of programs (e.g., sports, movies, comedy, etc.), quality ratings, adult content ratings, etc. The EPG 124 may also be communicated to the mobile device 102 over the program communication link 108 and stored in the mobile device 102. In another embodiment, the mobile device further provides a catalogue of data available from the distribution system. Such data includes audio, graphics, applications, and text which may be of interest to the user. In one embodiment, the catalogue is filtered by the device for each user.

The mobile device 102, the distribution system 110, and the content providers 112 may also be in communication with the repository device 140. For example, the system 100 may include a communication link 132 between the mobile device 102 and the repository device 140. The link 132 may comprise one or more of a wired or wireless network. In one embodiment, the link 132 comprises both a data network and a power connection, e.g., using an interface such as a Universal Serial Bus (USB) or IEEE-1394. In one embodiment, the link 132 comprises a power connection and a separate network such as a wireless Ethernet or Bluetooth connection.

The repository device 140 may include a charging module 134, a broadcast storage 136, and a broadband data interface 144. In one embodiment, the repository device 140 is not configured to decode received program content, but is rather configured to receive and store the content to the broadcast storage 136 and provide it to the mobile device 102 without decoding or altering the content. In one embodiment, the repository device 140 may be configured to at least partially encrypt the data as part of a digital rights management scheme.

In one embodiment, the charging module 134 is configured to provide a charge to the mobile device 102 over the communication link 132. In another embodiment, a separate charging connection or bus may be used. In one embodiment, the repository device 140 comprises multiple interfaces for communicating with and/or charging the mobile device 102. In one such embodiment, the repository device 140 may be configured to search or poll for a connected one of the interfaces.

As noted above, the communication link 132 may be a wired or wireless communication link configured to provide data and power to the mobile device 102, including for example, a wired USB 2.0 connection, a Bluetooth connection, a Fire-wire connection, or an alternative wired data and power connection. In another embodiment, the connection from the repository device 140 to the mobile device 102 may be used to charge the mobile device as well as transfer data between the mobile device and the repository device.

The broadband interface 142 may be configured to provide a communication interface for the repository device 140 and external entities, such as the distribution system 110, the content provider 112, or the mobile device 102 via network link 138 to a shared network, such as the Internet, with the mobile device 102 and the distribution system 110. The repository device 140 may also, or alternatively, be configured to communicate directly with the content provider 112 via the broadband interface 142 over another communication link 144. In one embodiment, the link 138 may comprise a two-way interface. In one embodiment, the communication link 144 comprises a one way or broadcast network. In one embodiment, the communication links 138 and/or 144 may be a wired or wireless communication link, such as, for example, a broadband internet connection or a Wi-Fi connection to a local network.

Figure 2:
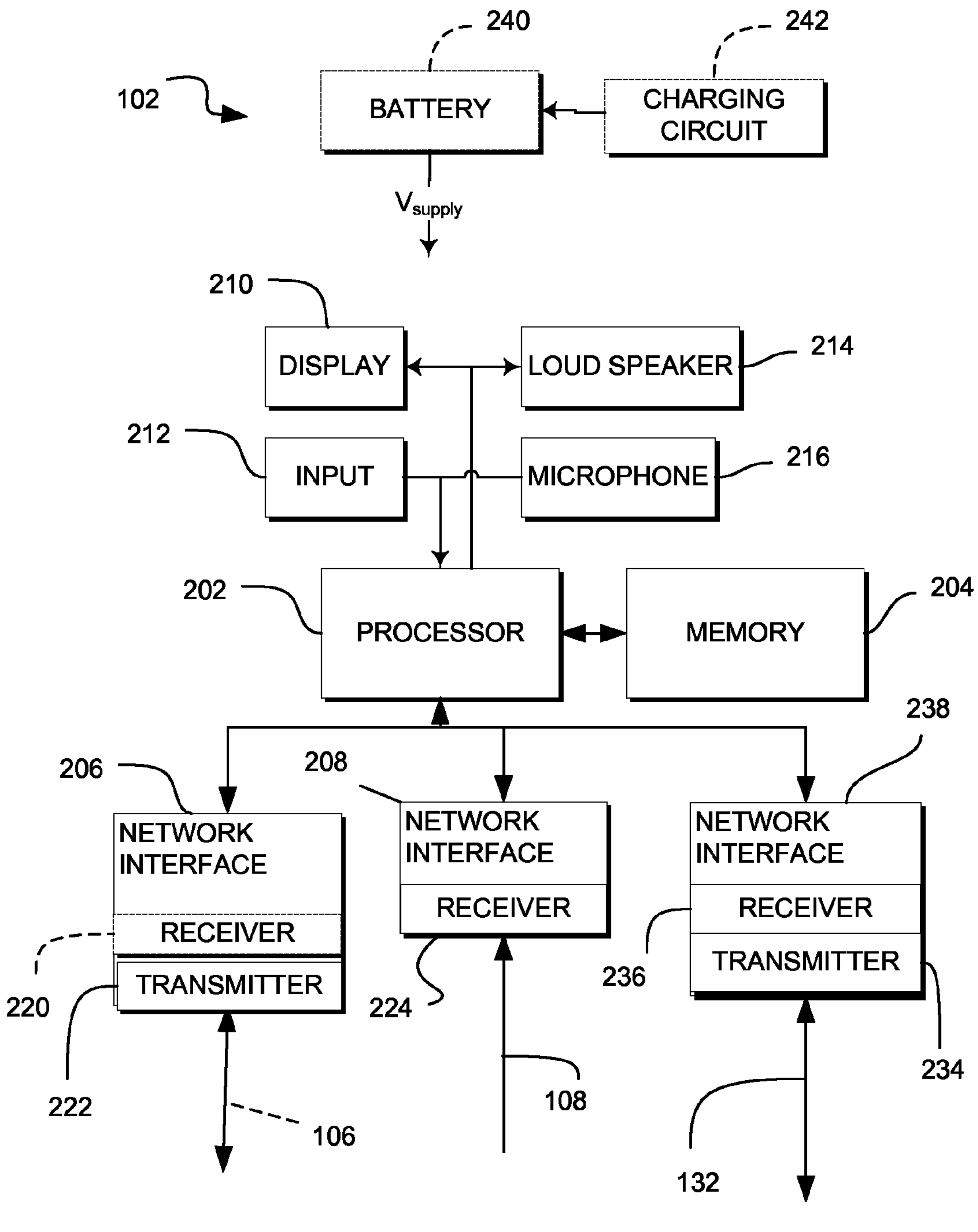
FIG. 2 is a block diagram illustrating an example of a mobile device such as illustrated in FIG. 1.

FIG. 2 is a block diagram illustrating an example of the mobile device 102 such as the one illustrated in FIG. 1. The mobile device 102 includes a processor 202 that may be in communication with a memory 204 and a network interface 208 that communicates over the program communication link 108. The network interface 208 includes a receiver 224 configured to receive data over the unidirectional program communication link 108. The network interface 208 and the receiver 224 may receive signals according to wired technologies including Ethernet, telephone (e.g., POTS), cable, power-line, and fiber optic systems, and/or wireless technologies comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a Mobile-Originated Short Message Service (MO-SMS) system, a 3G data network system, a high data rate (1xEV-DO or 1xEV-DO Gold Multicast) system, an IEEE 802.11 system, a MediaFLO system, a DMB system, an orthogonal frequency division multiple access (OFDM) system, or a DVB-H system.

The mobile device 102 may include an optional second network interface 206 for communicating using the bi-directional communication link 106. The network interface 206 may include any suitable antenna (not shown), a receiver 220, and a transmitter 222 so that the mobile device 102 can communicate with one or more devices over the bi-directional communication link 106.

The mobile device 102 may include an optional third network interface 238 for communicating using the wired or wireless communication link 132. The network interface 238 may include a receiver 236, a transmitter 234 so that the mobile device 102 can communicate with one or more devices over the communication link 132. In one embodiment, the mobile device 102 uses the wired or wireless communication link 132 to communicate with the repository device 140 of FIG. 1.

The mobile device 102 may also include one or more of a display 210, a user input device 212 such as a key, touch screen, or other suitable tactile input device, a loudspeaker 214 comprising a transducer adapted to provide audible output based on a signal received over the communication link 106 and/or a microphone 216 comprising a transducer adapted to provide audible input of a signal that may be transmitted over the communication links 106, 108, or 132.

The mobile device 102 may optionally include a battery 240 to provide power to one or more components of the device 102 and a charging circuit 242 configured to provide a power supply to the battery 240. The mobile device 102 may comprise at least one of a mobile handset, a personal digital assistant, a laptop computer, a headset, a vehicle hands free device, or any other electronic device. For example, one or more embodiments taught herein may be incorporated into a phone (e.g., a cellular phone), a personal data assistant ("PDA"), an entertainment device (e.g., a music or video device), a headset (e.g., headphones, an earpiece, etc.), a microphone, or any other suitable device.

The components described herein may be implemented in a variety of ways. Referring to FIG. 2, the mobile device 102 may be represented as a series of interrelated functional blocks that may represent functions implemented by, for example the processor 202, software (not shown), some combination thereof, or in some other manner as taught herein. For example, the processor 202 may facilitate user input using the input devices 212. Further, the transmitter 222 may comprise a processor (not shown in FIG. 2) that provides various functionalities relating to transmitting information, in example, to another mobile device. In much the same way, the transmitter 234 may also comprise a processor (not shown in FIG. 2) for transmitting information, in example, to a repository device 140. Also, the receivers 220, 224, or 236 may comprise a processor (not shown in FIG. 2) to provide various functions relating to receiving information, in example, from another mobile device.

The mobile device 102 may be configured to accept or deny concurrent input from communication links 106, 108, or 132. For example, the processor 202 may be incapable of performing the receiving and/or transmitting functions of the bidirectional network interface 206 at the same time that the broadband unidirectional interface 208 is receiving data or a signal over the program communication link 108. Thus, for example, in one embodiment, reception or display of a broadcast of a program may be discontinued over the program communication link 108 when a signal, e.g., a telephone call, is received over the communication link 106. In one embodiment, the transmission or display of a requested program from the repository device 140 may be discontinued over the program communication link 132 when the device is performing another task such as when the user is receiving a telephone call.

In some embodiments, the device or apparatus 102 may comprise an integrated circuit ("IC"). Thus, the integrated circuit may comprise one or more processors that provide the functionality of the processor components illustrated in FIG. 2. For example, in some embodiments a single processor may implement the functionality of the illustrated processor components, while in other embodiments more than one processor may implement the functionality of the illustrated processor components. In addition, in some embodiments the integrated circuit may comprise other types of components that implement some or all of the functionality of the illustrated processor components.

Any illustrative logical blocks, modules, and circuits described in connection with the embodiments disclosed herein may be implemented within or performed by an integrated circuit, an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those skilled in the art will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Figure 3:
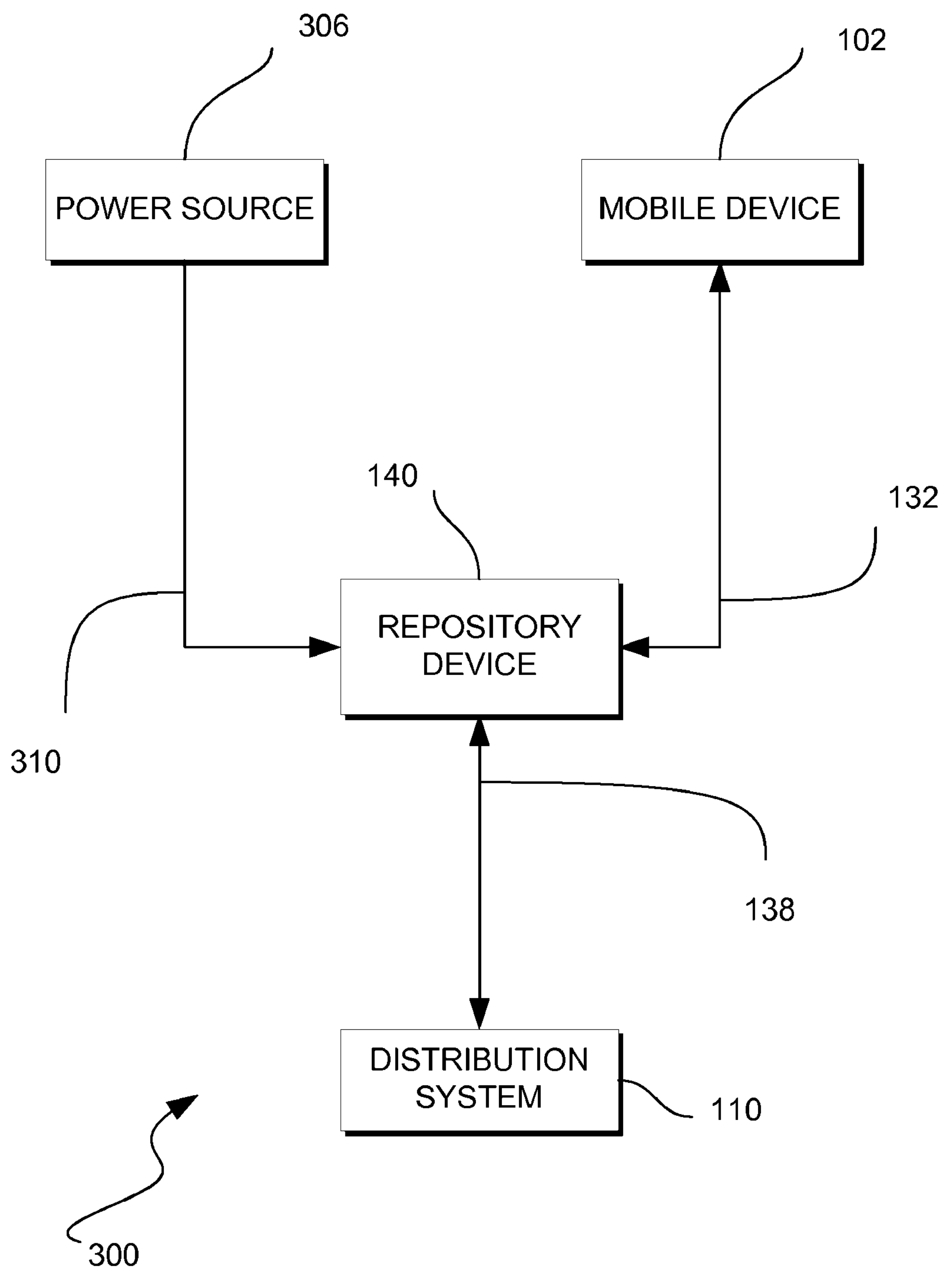
FIG. 3 is a block diagram illustrating an exemplary system for providing broadcast programming to a mobile device.

FIG. 3 is a block diagram illustrating an exemplary system 300 for providing data to the mobile device 102 via the repository device 140. While a single instance of the mobile device 102 is shown in FIG. 3, the exemplary system 300 may be configured to use any number of mobile devices 102. The system 300 provides an illustration of an exemplary system in which the repository device 140 provides both a charging function as well as a data transmission function by using the communication link 132. A device synchronization session may occur when a mobile device 102 is in proximity to the repository device 140 such as by using a network connection 310 in response to detecting the connection 132 has been established to the repository device 140. In one embodiment, the repository device 140 is configured to charge the mobile device 102 when the wired network connection is established using power provided by a power source 306. The power source 306 may be, for example, an electrical outlet, and may provide a current of power or a voltage source to the repository device 140 for charging the mobile device 102 via the link 310, which, in one embodiment, comprises one or more interface or bus components of the network connection 132. Alternatively, the connection 132 may be a separate connection from the power connection 306. For example, in one embodiment, the repository device 140 may be configured to charge the mobile device 102 by an implementation of the power connection 310 that is separate from the data connection 132 with the mobile device 102. In another implementation, there is no power connection between the repository device 140 and the mobile device 102.

In one embodiment, the repository device 140 is associated with one or more specified mobile device 102. Moreover, in one embodiment, the repository device 140 may include a storage module, a USB interface, and a Wi-Fi network interface. Also, the repository device 140 may periodically poll the distribution system 110 by employing a wide area network connection to determine if there are any programs scheduled for delivery to the particular repository device 140. In one embodiment, the repository device 140 comprises a device with persistent data connectivity. The mobile device 102 may automatically synchronize with the repository device 140 when in range to a wireless local area connection or when it is connected to such network by hardwire, such as by physical docking During the device synchronization session, the repository device 140 may be used to capture viewing usage data and thereby acquire data used to develop a profile of the user of the mobile device 102 for use in suggesting content, targeted advertising, or catalogue filtering.

The distribution system 110 may receive data representing multimedia program and other content from the content provider 112 (not shown in FIG. 3) and use the communication link 138 to transmit the content from the distribution center 110 to the repository device 140 in response to the mobile device 102 identifying the content.

The repository device 140 may be in communication with the mobile device 102 using the communication link 132. In one embodiment, the data connection 132 between the repository device 140 and the mobile device 102 may comprise signal and power components (e.g., a USB connection delivering power and data). In another embodiment, the data connection 132 may comprise a wireless network between repository device 140 and mobile device 102. The repository device 140 may communicate with the distribution system 110 using any suitable network connection includes a wired or wireless internet connection or a dedicated connection to a head-end such as via a cable head-end. The mobile device 102 may provide a suitable user interface for configuring the network connection of the repository device.

In one embodiment, the system 300 provides a data delivery service to the mobile device 102 by integration with the repository device 140. In one embodiment, the data service offerings are provisioned by a broadcast network, with the selected content being delivered to the repository device 140. Such content may comprise news, weather, sports, graphics, ringtones, wallpaper, application data, executables, or any other type of news, entertainment, or educational content.

Figure 4:
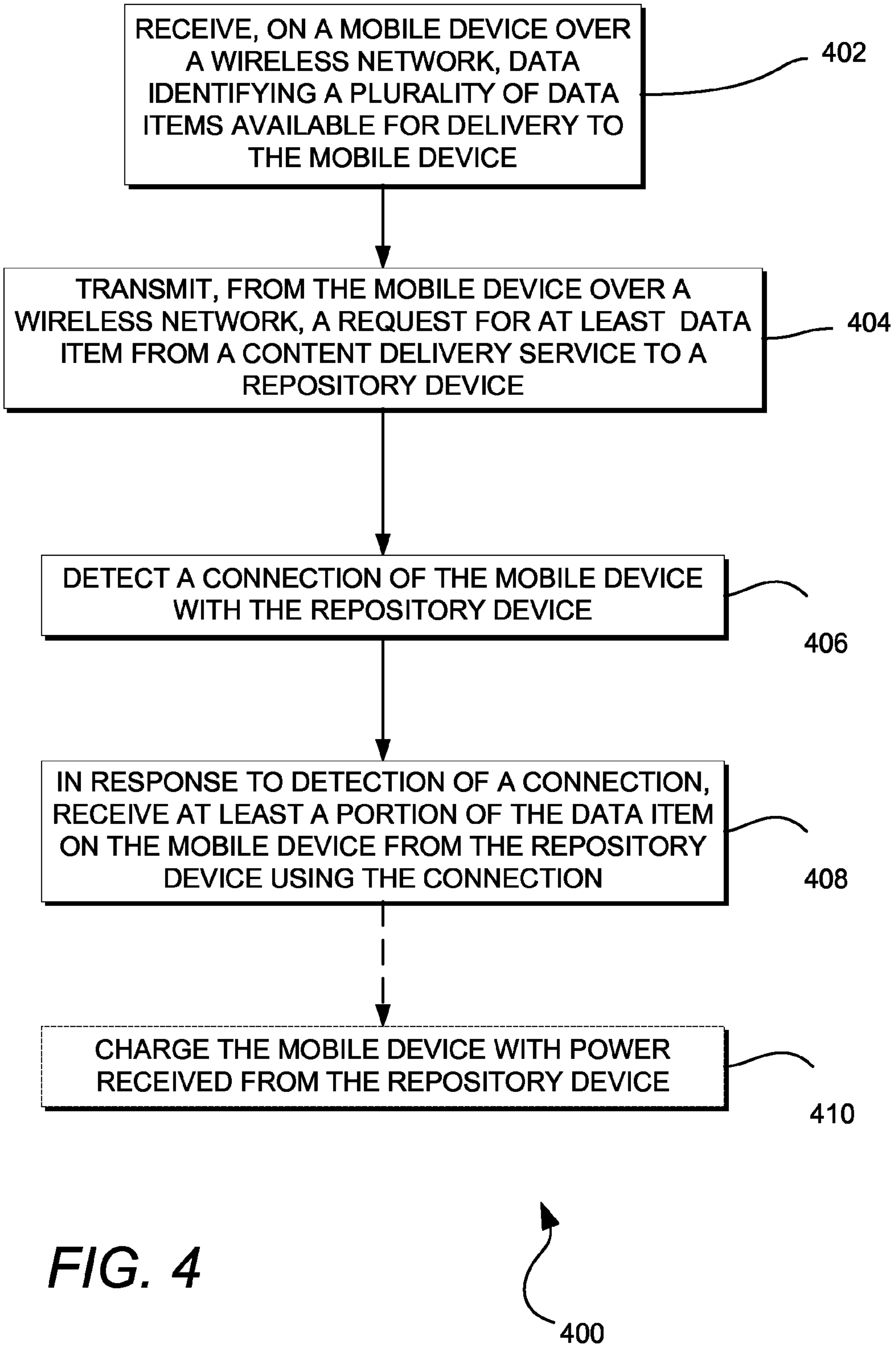
FIG. 4 is a flowchart illustrating an example of a method of accessing broadcast programs related to a component described in FIG. 1.

FIG. 4 is a flowchart illustrating an example of a method 400 of accessing broadcast programs by the mobile device 102. The method 400 begins at a block 402 in which the mobile device 102 receives data identifying available content from a broadcast network such as the broadcast network 108. The data may include a program catalogue that is received either via the network 108 or via another network such as the network 106. In one embodiment, the mobile device 102 may identify one or more of such content items for later receipt. The request may include one or more criteria for selecting the identified content, e.g., one or more of a keyword, a channel, a rating, or a ranking. In one embodiment, the request includes information identifying a series of content items, such as a recurring TV show. In one embodiment, the request identifies at least one interrupted broadcast of an interrupted program. For example, the mobile device 102 may determine that is unable to receive, or continue to receive, the program due to a condition associated with the mobile device 102 such as an incoming voice call, other activities on the mobile device 102, or conditions such a loss of network connectivity or reduction in network bandwidth or quality of service, a specified portion of the broadcast having a data quality indicator below a threshold, and a battery level falling below a specified threshold. The mobile device 102 may transmit the request in response to identifying the interrupted program. Next at a block 404, the mobile device 102, transmits over a wireless network, e.g., the network 106, a request of at least one content item from the content delivery service, e.g., a distribution system 110 or a content provider 112, to a repository device 140, e.g., for later retrieval by the mobile device 102. Next at a block 406, the mobile device 102 detects a connection, e.g., via the network connection 132, with the repository device 140. Moving to a block 408, in response to detection of a connection, the mobile device 102 receives at least a portion of the content item from the repository device 140 using the connection 132. Next at block 410, in one embodiment, the battery 240 of the mobile device 102 is charged with power received from the charging module 134 in the repository device 140.

Figure 5:
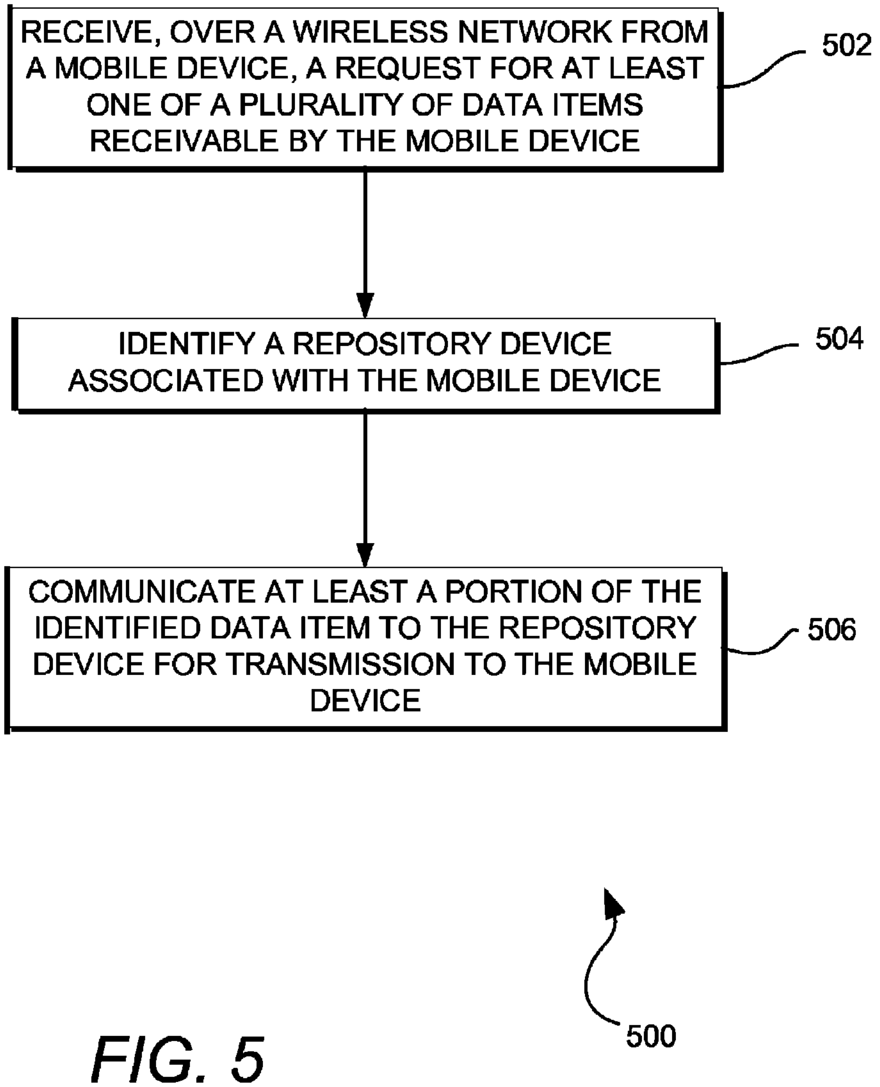
FIG. 5 is a flowchart illustrating an example of a method of accessing a broadcast program related to a component described in FIG. 1.

FIG. 5 is a flowchart illustrating an example of a method 500 of providing content, e.g., using the repository device 140. The method begins at a block 502 in which the distribution system 110, receives a request from the mobile device 102 for at least one content item. The request may comprise one or more criteria for identifying the content. The distribution system 110 may apply these criteria to select at least a portion of the content item and/or a series of related programs and communicate the portion or series in response to the selecting. Next in block 504, the distribution system 110 identifies an instance of the repository device 140 that is associated with the particular mobile device 102 that made the request. The distribution system 110 may retrieve device information of registered mobile devices 102 from a storage or other integral database, or from an external server device. Moving to a block 506, the distribution system 110 communicates at least a portion of the identified program to a persistent (e.g., persistently attached to the network connection with the distribution system 110) device such as the repository device 140 for transmission to the mobile device 102. The distribution system 110 may communicate with the repository device 140 over a broadband network, e.g., one of the network connections 138 or 144, that has a higher reliability than the broadcast network 108 communicating with the mobile device over the broadcast network. Based on the specific mobile device 102 and the specific repository device are identified by the distribution system 110, the distribution system 110 transmits the mobile device requested content to the specific repository device 140 for later transmission to the mobile device 102.

Figure 6:
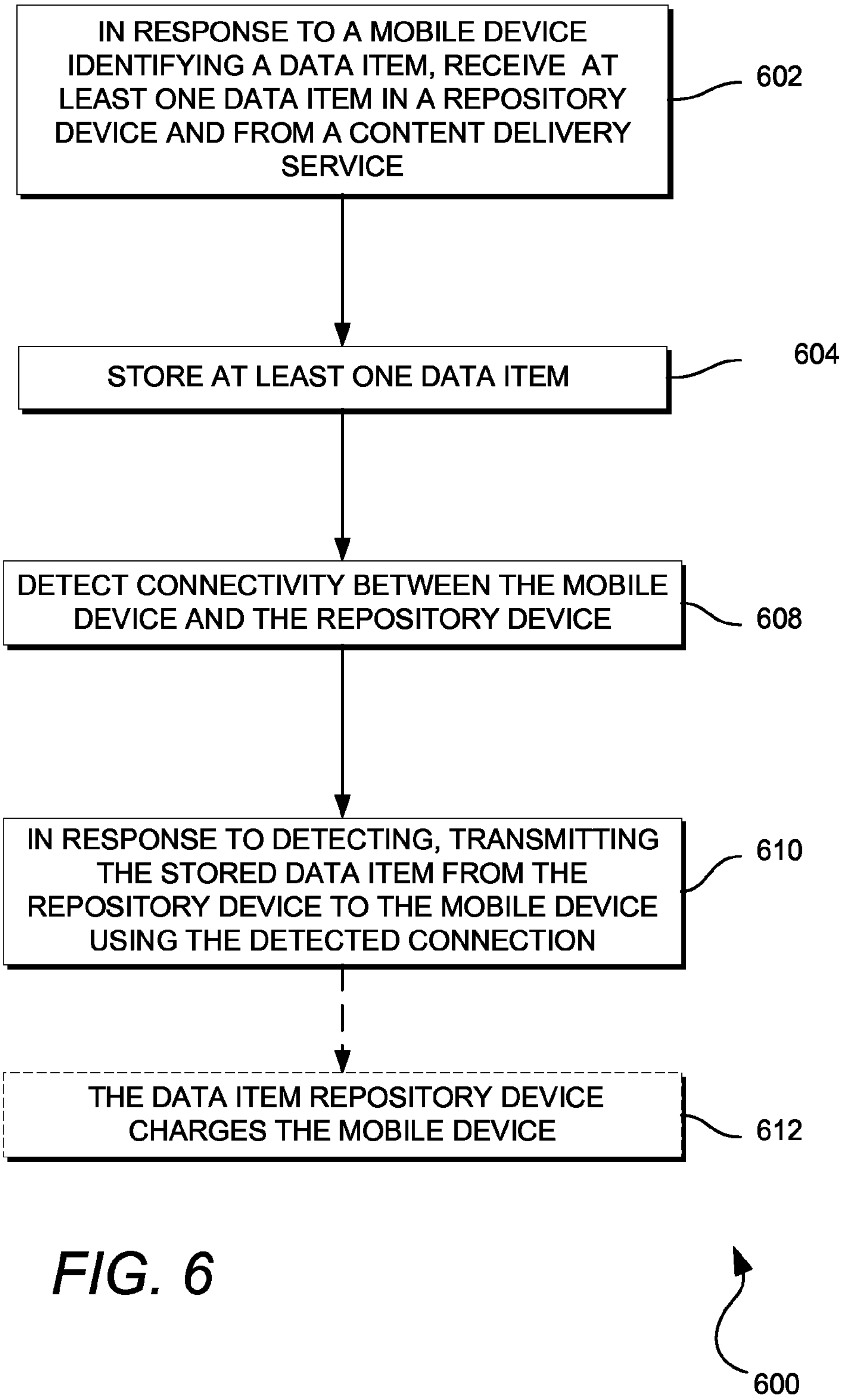
FIG. 6 is a flowchart illustrating an example of a method accessing a broadcast program related to a component described in FIG. 1.

FIG. 6 is a flowchart illustrating an example of a method 600 of accessing requested content via the mobile device 102. The method 600 begins at a block 602 in which a repository device 140 receives at least one content item in response to the mobile device 102 identifying or requesting the content for delivery to the repository device 140. Next at a block 604, the repository device 140 stores the content, e.g., to the storage 136. Next at a block 608, the repository device 140 detects a connection to the mobile device, e.g., using the communication link 132. The communication link 132 may comprises a wireless or wired USB connection to detect a connection with a local mobile device. Moving to a block 610, in response to detecting the mobile device 102, the repository device 140 transmits the stored content to the mobile device 102 using the detect connection to the communication link 132. Proceeding to a block 612, the repository device 140, and in particular, the charging module 134, charges the mobile device 102. In one embodiment, the charging power is provided via a shared bus or cable with the communication link 132, e.g., via USB. Desirably, the content is conveniently and transparently communicated to the mobile device 102 when, for example, the mobile device is charged.

In one embodiment, the broadcast program storage 136 within the repository device 140 is configured to delete content once transfer of the content to the mobile device 102 has been complete. In another embodiment, the broadcast program storage 136 within the repository device 140 maintains content until space is needed to store newly requested content by the user, wherein the oldest content is deleted first from memory.

The apparatuses and methods of the disclosure may be used to provide a television "on-demand" service by allowing the mobile device to provide a user with the ability to identify broadcast programs that may include such on-demand content, while delivery may be facilitated using the repository device 140. The purchases could be one time purchases, or alternatively a purchase of some or all episodes of a recurring series. For sports programming, the delivered content may include full games, compressed games, highlights or all or a portion of the games in a season for a team or teams. A mobile device 102 may also be configured to provide a request to provide all content related to a particular entity or subject matter. For example, a "NY Yankees" criterion may deliver games, interviews, and film documentaries about the NY Yankees baseball team.

In one embodiment, the "on-demand" delivery may include options to buy, rent, or subscribe which are then implemented with the aid of security keys and rights management algorithms executing on the mobile device 102, the repository device 140, and/or the distribution system 110. For example, a subscription service may be configured to allow users to manage a list of programs whereby upon expiry or completed viewing the programs or movies are deleted from the device and new programs or movies are delivered via the repository device 140.

The apparatuses and methods of the disclosure may be used to provide a personal video recording (PVR) service in which programming selected from the broadcast network 108 via a schedule may be recorded for viewing at a later time by the repository device 140. Such a PVR service may be configured to allow a user to select shows or programs from data received via the program guide server 126 to the program guide 124 of the mobile device. The items are selected by tagging items based on the program guide 124 and flagged for delivery via the repository device 140 according to the methods described above.

In an exemplary embodiment of a service provided by the system 100, an enhanced program may be developed by content provider 112 for transmitting to the mobile device 102 which may include addition content, e.g., content that introduces or expands on the broadcast content for, for example, episodes of a services. Desirably, content providers may use such added content to enhance shows provided by the system 100 to take advantage of increased bandwidth available to the repository device 140. Furthermore, in another embodiment, the program may also be updated with ancillary clips, videos, audio, and other information for that show (behind the scenes, etc.).

In some embodiments, the repository device 140 includes an air-interface (e.g., a digital television receiver such as an ATSC receiver) to receive a broadcast transmission so as to record desired programs from the broadcast network and thereby conserve bandwidth of the wide area network used to bi-directional communicate with the distribution center 110 while still providing the program to the mobile device 102.

The apparatuses and methods of the disclosure may be used to provide a personalized channel service, whereby the mobile device 102 is provided with content based on preference selections made by the associated user. Per-channel meta tag data may be distributed to subscribed users by way of the repository device 140, which allows each user to describe, or in other words filter, the content that they would like to see by reference to the selected tags. These filters can be set or managed from the mobile device 102, or from a website provided by the broadcasting entity. These filters are preferably specific to a channel (i.e., MLB, CNN, MTV, etc.) or could be a mixture of programming from different channels. For example, a “My MLB Channel” would allow a user to select a team (or teams) that the user may be interested in and select a player (or players) that user may be interested in. One of the repository device 140, the distribution system 110, or the mobile device 102 may be configured to store these filters and deliver (or request delivery) of the programs matching the filters (team highlights, player highlights, etc) to the mobile device 102. For example, a “My CNN Channel” may be configured using such filters to allow a user to select a topic area of interest (technology, politics, world news, health, sports) and receive matching programs on their mobile device 102 via the repository device 140.

The apparatuses and methods of the disclosure may be used to provide a user to build a personalized radio station, preferably in a subscription based transaction. Meta data may also be provided to the mobile device for the user to filter the type of music they like (Rock, Blues, Country or other criteria, with potential granularity to year or artists). Filters are then set or managed from the mobile device 102, or from a website of the subscription service provider. Over time, these “heuristics” may be based on actual usage data of what the user listens to the most which results in maintenance of the filters becoming automatic/intelligent, and less burdensome to the user. The repository device 140 and/or the distribution system 110 may store these filters and match them to data such as from the program guide service 126, and receive songs (audio files) matching the filter criteria to the mobile device (i.e., 50-100 songs per station, continuously updated using the repository device). Additionally, user can “rate”music (1 star, 5 stars) to provide additional criteria for the filtering. As mentioned above, over time, more intelligent/automatic heuristic profile can be built to automatically determine what the user likes, and doesn’t like. In some embodiments, user can skip songs on station, or exercise a “buy it” option, which will unlock the song out of the “station”, and charge the user for the song. In other embodiments, songs are replaced with full music videos to create a fuller user experience. Furthermore, users could “publish” their personalized stations and make the stations available to others as Internet streams from the distribution system 110 or content provider 112 to potentially drive additional viral purchases.

In one embodiment, because the delivered programs are from content that has already been broadcast, the distribution system 110 stores each program for a predetermined time to enable repository device 140 distributions for any subsequent PVR requests. Alternatively, each repository device 140 may record all or some of the programs over a predetermined period so as to allow a mobile device 102 to select a recording option after a program has already aired. In another embodiment, the mobile device 102 maintains an event log which indicates when the device experienced reception degradation or total loss. The repository device 140 then refers to the event log to determine whether the user has been viewing a program which was interrupted. In one implementation, the repository device 140 provides an interface for the mobile device user to specify whether they would like to retrieve the remainder of the interrupted program. If the user would like to retrieve the remaining, interrupted portion of the program, the repository device 140 retrieves the program from the distribution system 110 as discussed above with respect to “on-demand” operations or alternatively retrieves the remainder from local memory, if such portion is already resident in the broadcast program storage 136 of the repository device 140. In one embodiment, the repository device 140 proceeds to patch the remaining portion to the viewed portion, if the user selects a “complete” option.

The apparatuses and methods described herein may be used to provide an improved mobile broadcast network with the ability to provide targeted advertising by ensuring that various advertisements are stored on the mobile device 102 as may be required by the network operator to facilitate a targeted advertisement function. Specifically, the system of the disclosure minimizes the challenges related to guaranteeing file delivery to mobile devices 102 where otherwise the operator would be uncertain as to whether a file or targeted advertising content arrived at the mobile device 102 due to the device synchronization requirements discussed above. Additionally, instead of transmitting all possible advertisements over the broadcast network to then be filtered at the device 102 based on user profiles, which may be the condition in a purely broadcast environment, the distribution system 110 may push to the repository device 140 advertisements that are relevant to the retrieved profile since it has available data relating to the user’s profile by way of the collected usage data, so as to guarantee delivery, and conserve network capacity. Accordingly, instead of occupying network capacity for delivering all ads over the broadcast network 108, the system 10 may be configured to allow for the filtering to take place at the repository device 140 (or alternatively at the distribution system 110) which conserves transmission bandwidth of the broadcast operator, and guarantees delivery of the appropriate targeted advertising. Finally, one embodiment of the system 100 may be configured for delivery of interactive clickthrough/call to action content which may not be delivered to mobile devices 102 otherwise due to bandwidth requirements or other requirements.

While the above detailed description has shown, described, and pointed out novel features of the invention as applied to various embodiments, it will be understood that various omissions, substitutions, and changes in the form and details of the device or process illustrated may be made by those skilled in the art without departing from the scope of this disclosure. As will be recognized, the invention may be embodied within a form that does not provide all of the features and benefits set forth herein, as some features may be used or practiced separately from others. The scope of this disclosure is defined by the appended claims, the foregoing description, or both. All changes which come within the meaning and range of equivalency of the claims are to be embraced within their scope.

The invention claimed is:

1. A method of accessing multimedia content on a mobile device comprising the steps of:

receiving, over a wireless network, data identifying a plurality of data items from a content delivery service;

transmitting, over a wireless network, a request to a repository device identifying at least one requested data item from the content delivery service ;

detecting a communication link with the repository device, wherein the communication line comprises a data network connection;

receiving at least a portion of the at least one requested data item from the repository device over the communication link; and receiving a charge current from the repository device over the communication link, wherein the received charge current supplies power in the mobile device.

2. The method of claim 1, wherein the plurality of data items are receivable over a broadcast network.

3. The method of claim 2, wherein receiving at least a portion of the at least one requested data item comprises receiving at least the portion of the at least one requested data item over a broadcast network.

4. The method of claim 1, wherein the request to the repository device identifying at least one requested data item comprises at least one criterion for selecting the at least one requested data item.

5. The method of claim 4, wherein the at least one criterion comprises at least one of a keyword, a channel, a rating, or a ranking.

6. The method of claim 1, wherein the request to the repository device identifying at least one requested data item comprises information identifying a series of related data items.

7. The method of claim 1, wherein the request to the repository device identifying at least one requested data item identifies at least one interrupted broadcast of the at least one of the plurality of data items from the content delivery service.

8. The method of claim 7, wherein transmitting the request to the repository device is performed in response to identifying the at least one interrupted broadcast.

9. The method of claim 7, wherein identifying the at least one interrupted broadcast comprises identifying a broadcast interrupted by at least one of:

an incoming voice call, a loss of network connectivity, a specified portion of the broadcast having a data quality indicator below a threshold, and a battery level falling below a specified threshold.

10. A method of providing multimedia content by a repository device to at least one mobile device comprising the steps of:

receiving, from a mobile device over a wireless network, a request identifying at least one data item from a content delivery service;

receiving the at least one requested data item from the content delivery service in response to receiving the request;

storing the at least one requested data item;

detecting a communication link to the mobile device, wherein the communication link comprises a data network connection;

transmitting the at least one requested data item to the mobile device over the communication link in response to detecting the communication link; and providing a power supply to the mobile device over the communication link, wherein the power supply is configured to charge a battery in the mobile device.

11. The method of claim 10, wherein receiving the at least one requested data item from the content delivery service comprises receiving a broadcast of the at least one requested data item over a broadcast network.

12. The method of claim 11, wherein receiving the at least one requested data item from the content delivery service further comprises:

selecting at least one broadcast of the at least one data item based on the received request identifying the at least one requested data item.

13. The method of claim 12, wherein the request identifying the at least one requested data item comprises at least one criterion for selecting the at least one requested data item, and wherein selecting at least one broadcast of the at least one data item is based on the at least one criterion.

14. The method of claim 13, wherein the at least one criterion comprises at least one of a keyword, a channel, a rating, or a ranking.

15. The method of claim 10, wherein the received request identifying the at least one requested data item comprises an information identifying a series of broadcasts of a plurality of data items.

16. The method of claim 10, wherein receiving the at least one requested data item from the content delivery service is performed concurrently with transmitting the at least one requested data item to the mobile device.

17. An apparatus, comprising:

a storage device;

a power supply;

a network interface; and a processor coupled to the storage device, the power supply, and the network interface, wherein the processor is configured with processor-executable instructions to perform operations comprising:

receiving data identifying a plurality of data items from a content delivery service;

transmitting a request to a repository device identifying at least one requested data item from the content delivery service;

detecting a communication link to the repository device, wherein the communication link comprises a data network connection;

receiving at least a portion of the at least one requested data item from the repository device over the communication link; and receiving a charge current from the repository device over the communication link, wherein the received charge current supplies power.

18. The apparatus of claim 17, wherein the processor is configured with processor-executable instructions to perform operations such that the apparatus is unable to decode the at least one data item.

19. The apparatus of claim 17, wherein the processor is configured with processor-executable instructions to perform operations such that the request to a repository device identifying at least one requested data item includes at least one criterion for selecting the at least one requested data item.

20. The apparatus of claim 19, wherein the processor is configured with processor-executable instructions to perform operations such that the at least one criterion comprises at least one of a keyword, a channel, a rating, or a ranking.

21. The apparatus of claim 17, wherein the processor is configured with processor-executable instructions to perform operations such that the request to the repository device identifying at least one requested data item from the content delivery service comprises information identifying a series of at least one data item from the content delivery service.

22. The apparatus of claim 21, wherein the processor is configured with processor-executable instructions to perform operations such that the information identifying the series of at least one data item comprises at least one interrupted broadcast of the at least one data item.

23. The apparatus of claim 22, wherein the processor is configured with processor-executable instructions to perform operations such that transmitting the request to the repository device identifying the at least one requested data item is performed in response to identifying the at least one interrupted broadcast.

24. The apparatus of claim 23, wherein the processor is configured with processor-executable instructions to perform operations such that identifying the at least one interrupted broadcast comprises identifying a broadcast interrupted by at least one of:

an incoming voice call, a loss of network connectivity, a specified portion of the broadcast having a data quality indicator below a threshold, and a battery level falling below a specified threshold.

25. A repository device, comprising:

a storage device;

a power supply;

a network interface; and a processor coupled to the storage device, the power supply, and the network interface, wherein the processor is configured with processor-executable instructions to perform operations comprising:

receiving, from a mobile device, a request identifying at least one requested data item from a content delivery service;

receiving the at least one requested data item from the content delivery service in response to receiving the request from the mobile device;

storing the at least one requested data item;

detecting a communication link to the mobile device, wherein the communication link comprises a data network connection;

transmitting the at least one requested data item to the mobile device over the communication link in response to detecting the communication link to the mobile device; and providing a charge current to the mobile device over the communication link, wherein the charge current supplies power to the mobile device.

26. The repository device of claim 25, wherein the processor is configured with processor-executable instructions to perform operations such that receiving the at least one data item comprises receiving a broadcast of the at least one data item over a broadcast network.

27. The repository device of claim 25, wherein the processor is configured with processor-executable instructions to perform operations such that receiving the at least one requested data item from the content delivery service comprises:

receiving a plurality of broadcasts of a plurality of data items from the content delivery service; and selecting at least one broadcast of the at least one requested data item based on-the received request identifying the at least one requested data item.

28. The repository device of claim 27, wherein the processor is configured with processor-executable instructions to perform operations such that the received request comprises at least one criterion for selecting the at least one requested data item.

29. The repository device of claim 28, wherein the processor is configured with processor-executable instructions to perform operations such that the at least one criterion comprises at least one of a keyword, a channel, a rating, or a ranking.

30. The repository device of claim 25, wherein the processor is configured with processor-executable instructions to perform operations such that receiving the at least one requested data item from the content delivery service is performed concurrently with transmitting the at least one requested data item to the mobile device.

31. A mobile device, comprising:

a storage device;

a power supply;

a network interface; and a processor coupled to the storage device, the power supply, and the network interface, wherein the processor is configured with processor-executable instructions to perform operations comprising:

receiving, over a wireless network, data identifying a plurality of data items from a content delivery service;

transmitting, over the wireless network, a request to a repository device identifying at least one requested data item from the content delivery service, wherein transmitting the request occurs in response to identifying at least one interrupted broadcast of the plurality of data items;

detecting a communication link with the repository device, wherein the communication link comprises a data network connection;

in response to detecting the communication link, receiving the at least one requested data item from the repository device over the communication link; and receiving a charge current from the repository device over the communication link, wherein the received charge current is used by the power supply in the mobile device.

32. The mobile device of claim 31, wherein the data items are receivable over a broadcast network.

33. The mobile device of claim 32, wherein the processor is configured with processor-executable instructions to perform operations such that:

receiving, over a wireless network, data identifying a plurality of data items comprises receiving, over a broadcast network, the data identifying the plurality of data items.

34. The mobile device of claim 31, wherein the processor is configured with processor-executable instructions to perform operations such that transmitting the request to the repository device identifying at least one requested data item comprises transmitting to the repository device at least one criterion for selecting the at least one requested data item.

35. The mobile device of claim 34, wherein the at least one criterion comprises at least one of a keyword, a channel, a rating, or a ranking

36. The mobile device of claim 31, wherein the processor is configured to perform processor-executable instructions such that the request to the repository device identifying at least one requested data item comprises information identifying a series of related data items.

37. A repository device comprising:

a storage device;

a power supply;

a network interface; and a processor coupled to the storage device, the power supply, and the network interface, wherein the processor is configured with processor-executable instructions to perform operations comprising:

receiving, from a mobile device over a wireless network, a request identifying at least one interrupted broadcast of at least one data item associated with a content delivery service;

receiving, from the content delivery service, at least one data item identified in the request from the mobile device;

storing the at least one received data item;

detecting a communication link with the mobile device, wherein the communication link comprises a data network connection;

transmitting the at least one received data item to the mobile device over the communication link in response to detecting the communication link with the mobile device; and providing a charge current to the mobile device over the communication link, wherein the charge current is configured to supply power to the mobile device.

38. The repository device of claim 37, wherein the processor is configured with processor-executable instructions to perform operations such that receiving, from the content delivery service, the at least one data item occurs in response to receiving the request identifying the at least one interrupted broadcast.

39. The repository device of claim 37, wherein the processor is configured with processor-executable instructions to perform operations such that the at least one interrupted broadcast identified by the request was interrupted by at least one of:

an incoming voice call, a loss of network connectivity, a specified portion of the broadcast having a data quality indicator below a threshold, and a battery level falling below a specified threshold.

40. A wireless communication apparatus, comprising:

means for receiving, over a wireless network, data identifying a plurality of data items from a content delivery service;

means for transmitting, over the wireless network, a request to a repository device identifying at least one requested data item from the content delivery service, wherein transmitting the request occurs in response to identifying at least one interrupted broadcast of the at least one requested data item;

means for detecting a communication link with the repository device, wherein the communication link comprises a data network connection;

means for receiving at least a portion of the at least one requested data item from the repository device, wherein the at least a portion is received over the communication link, and is received in response to detecting the communication link; means for receiving a charge current from the repository device over the communication link; and means for using the received charge current to supply power in the wireless communications apparatus.

41. The wireless communication apparatus of claim 40, wherein the plurality of data items are receivable over a broadcast network.

42. The wireless communication apparatus of claim 41, wherein means for receiving data identifying a plurality of data items comprises means for receiving the data identifying a plurality of data items over a broadcast network.

43. The wireless communication apparatus of claim 40, wherein means for transmitting a request to the repository device comprises means for transmitting to the repository device at least one criterion for selecting the at least one requested data item.

44. The wireless communication apparatus of claim 43, wherein the at least one criterion comprises at least one of a keyword, a channel, a rating, or a ranking.

45. The wireless communication apparatus of claim 40, wherein means for transmitting a request to the repository device comprises means for transmitting information identifying a series of related data items.

46. A repository device, comprising:

means for receiving, from a wireless communication apparatus over a wireless network, a request identifying at least one requested data item from a content delivery service;

means for receiving, from the wireless communication apparatus over the wireless network, a request identifying at least one interrupted broadcast of at least one data item from the content delivery service;

means for receiving the at least one requested data item from the content delivery service;

means for storing the at least one requested data item;

means for detecting a communication link with the wireless communication apparatus, wherein the communication link comprises a data network connection;

means for transmitting the at least one requested data item to the wireless communication apparatus over the communication link; and means for providing a charge current over the communication link, wherein the charge current is configured to supply power to the wireless communication apparatus.

47. The repository device of claim 46, wherein the means for receiving the at least one requested data item comprises means for receiving the at least one requested data item in response to receiving the request identifying the at least one interrupted broadcast.

48. The repository device of claim 46, wherein the at least one interrupted broadcast identified by the request was interrupted by at least one of:

an incoming voice call, a loss of network connectivity, a specified portion of the broadcast having a data quality indicator below a threshold, and a battery level falling below a specified threshold.

49. A non-transitory computer-readable storage medium having stored thereon processor-executable instructions configured to cause a processor of a mobile device to perform operations comprising:

receiving, over a wireless network, data identifying a plurality of data items from a content delivery service;

transmitting, over the wireless network, a request to a repository device identifying at least one requested data item from the plurality of data items, wherein transmitting the request occurs in response to identifying at least one interrupted broadcast of at least one of the plurality of data items;

detecting a communication link with the repository device, wherein the communication link comprises a data network connection;

receiving at least a portion of the at least one requested data item over the communication link in response to detecting the communication link;

receiving a charge current from the repository device over the communication link; and using the charge current to supply power in the mobile device.

50. The non-transitory computer-readable storage medium of claim 49, wherein the stored processor-executable instructions are configured to cause a processor of a mobile device to perform operations such that the plurality of data items are receivable over a broadcast network.

51. The non-transitory computer-readable storage medium of claim 50, wherein the stored processor-executable instructions are configured to cause a processor of a mobile device to perform operations such that receiving at least a portion of the at least one requested data item over the wireless network comprises receiving the at least a portion of the at least one requested data item over a broadcast network.

52. The non-transitory computer-readable storage medium of claim 49, wherein the stored processor-executable instructions are configured to cause a processor of a mobile device to perform operations such that transmitting the request to the repository device comprises transmitting at least one criterion for selecting the at least one requested data item.

53. The non-transitory computer-readable storage medium of claim 52, wherein the at least one criterion comprises at least one of a keyword, a channel, a rating, or a ranking

54. The non-transitory computer-readable storage medium of claim 49, wherein the stored processor-executable instructions are configured to cause a processor of a mobile device to perform operations such that transmitting the request to the repository device comprises transmitting information identifying a series of related data items.

55. A non-transitory computer-readable storage medium having stored thereon processor-executable instructions configured to cause a processor of a repository device to perform operations comprising:

receiving, from a mobile device over a wireless network, a request identifying at least one interrupted broadcast of at least one requested data item associated with a content delivery service;

receiving at least one requested data item from the content delivery service;

storing the at least one requested data item;

detecting a communication link with the mobile device, wherein the communication link comprises a data network connection;

transmitting the at least one requested data item to the mobile device over the communication link in response to detecting the communication link with the mobile device; and providing a charge current to the mobile device over the communication link, wherein the charge current is configured to supply power to the mobile device.

56. The non-transitory computer-readable storage medium of claim 55, wherein the stored processor-executable instructions are configured to cause a processor of a repository device to perform operations such that receiving the at least one requested data item from the content delivery service occurs in response to receiving the request identifying the at least one interrupted broadcast.

57. The non-transitory computer-readable storage medium of claim 55, wherein the stored processor-executable instructions are configured to cause a processor of a repository device to perform operations such that identifying the at least one interrupted broadcast comprises identifying a broadcast interrupted by at least one of:

an incoming voice call, a loss of network connectivity, a specified portion of the broadcast having a data quality indicator below a threshold, and a battery level falling below a specified threshold.

* * * * *